(12) United States Patent
Fujiwara

(10) Patent No.: US 9,352,250 B2
(45) Date of Patent: May 31, 2016

(54) SLUDGE SCRAPING APPARATUS

(75) Inventor: Michihiro Fujiwara, Osaka (JP)

(73) Assignee: FUJIWARA INDUSTRY CO., LTD., Osaka (JP)

( * ) Notice: Subject to any disclaimer, the term of this patent is extended or adjusted under 35 U.S.C. 154(b) by 326 days.

(21) Appl. No.: 13/603,171

(22) Filed: Sep. 4, 2012

(65) Prior Publication Data
US 2013/0153491 A1    Jun. 20, 2013

(30) Foreign Application Priority Data

Sep. 8, 2011    (JP) ................................. 2011-213396
Aug. 7, 2012    (JP) ................................. 2012-175102

(51) Int. Cl.
| | |
|---|---|
| *B01D 21/04* | (2006.01) |
| *B01D 21/18* | (2006.01) |
| *B01D 21/20* | (2006.01) |
| *B01D 21/24* | (2006.01) |

(52) U.S. Cl.
CPC ................ *B01D 21/20* (2013.01); *B01D 21/04* (2013.01); *B01D 21/18* (2013.01); *B01D 21/2438* (2013.01)

(58) Field of Classification Search
CPC ........ B01D 21/18; B01D 21/04; B01D 21/20; B01D 21/183; B01D 21/245; B01D 21/2438; B01D 21/2483; E02F 3/46; E02F 3/54; E02F 3/60
USPC ...................... 210/523–527, 531; 37/342, 343
See application file for complete search history.

(56) References Cited

U.S. PATENT DOCUMENTS

| | | | | |
|---|---|---|---|---|
| 4,111,802 | A | * | 9/1978 | Louboutin ..................... 210/713 |
| 5,265,710 | A | * | 11/1993 | Gabas et al. ............. 192/111.12 |
| 5,288,404 | A | * | 2/1994 | Marsh ............................ 210/519 |
| 5,478,471 | A | * | 12/1995 | Fujiwara ....................... 210/527 |

(Continued)

FOREIGN PATENT DOCUMENTS

| | | |
|---|---|---|
| CA | 2094514 A1 | 2/1993 |
| CA | 2113422 C | 9/1999 |
| JP | 2001224908 A * | 8/2001 |

(Continued)

OTHER PUBLICATIONS

Office Action issued May 15, 2014 in corresponding KR application No. 10-2012-0097539.

(Continued)

*Primary Examiner* — Joseph Drodge
(74) *Attorney, Agent, or Firm* — Knobbe Martens Olson & Bear LLP

(57) ABSTRACT

The present invention provides a sludge scraping apparatus which includes a piston attached to a traction core member, a body formed of a driving cylinder provided with front and rear sealing connection parts, a sludge scraper attached to the body, position switching means that switches the sludge scraper to a scraping position at advancement of the body and switches the sludge scraper to a non-scraping position at retreat of the body, and a treatment part attached in front of the driving cylinder and has a treatment chamber therein, the extending part of the traction core member passing through the treatment chamber, and the body can be moved along the traction core member in an advancing and retreating direction by injection/discharge of water into/from the driving cylinder by fluid control means, and at movement of the body, injection/discharge of water into/from the treatment chamber is performed.

8 Claims, 3 Drawing Sheets

(56) References Cited

U.S. PATENT DOCUMENTS 6,199,704 B1 * 3/2001 Fujiwara .................. 210/525
7,234,600 B2 * 6/2007 Fujiwara .................. 210/527

FOREIGN PATENT DOCUMENTS

| JP | 2005-131627 | A |   | 5/2005 |
| JP | 2005131627 | A | * | 5/2005 |
| JP | 2006205147 | A | * | 8/2006 |
| JP | 2007029941 | A | * | 2/2007 |
| KR | 10-0755258 | B1 |  | 8/2007 |
| KR | 10-2007-0106845 | A |  | 11/2007 |

OTHER PUBLICATIONS

Decision of Grant issued Dec. 30, 2014 in corresponding Korean Application No. 10-2012-0097539.
Office Action issued Sep. 18, 2014 in corresponding CA application No. 2807980.

* cited by examiner

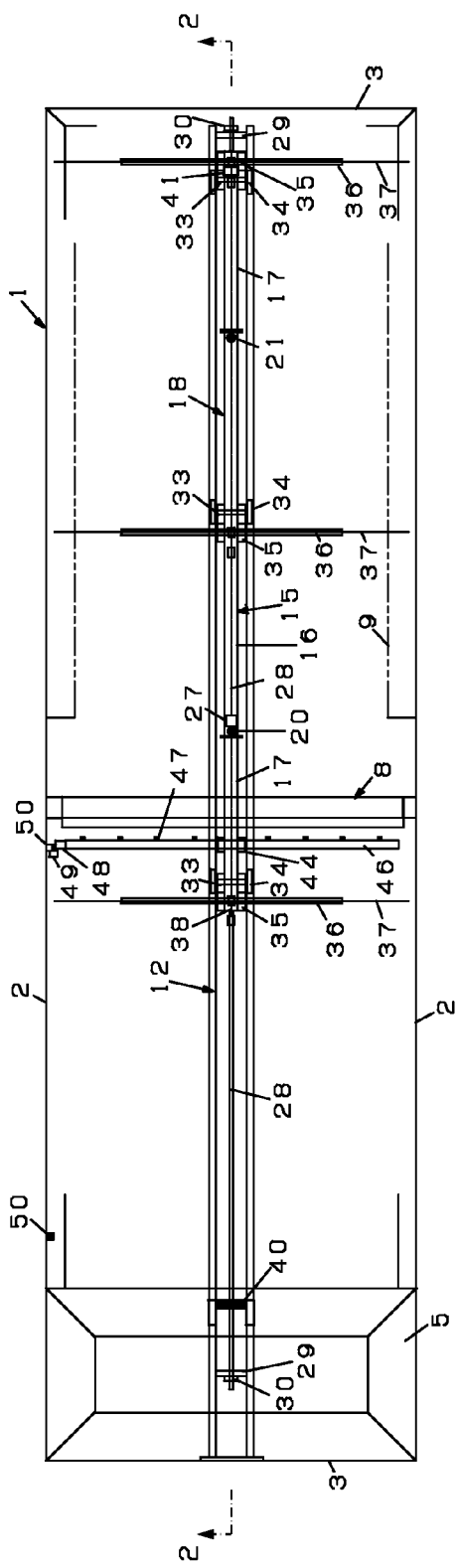
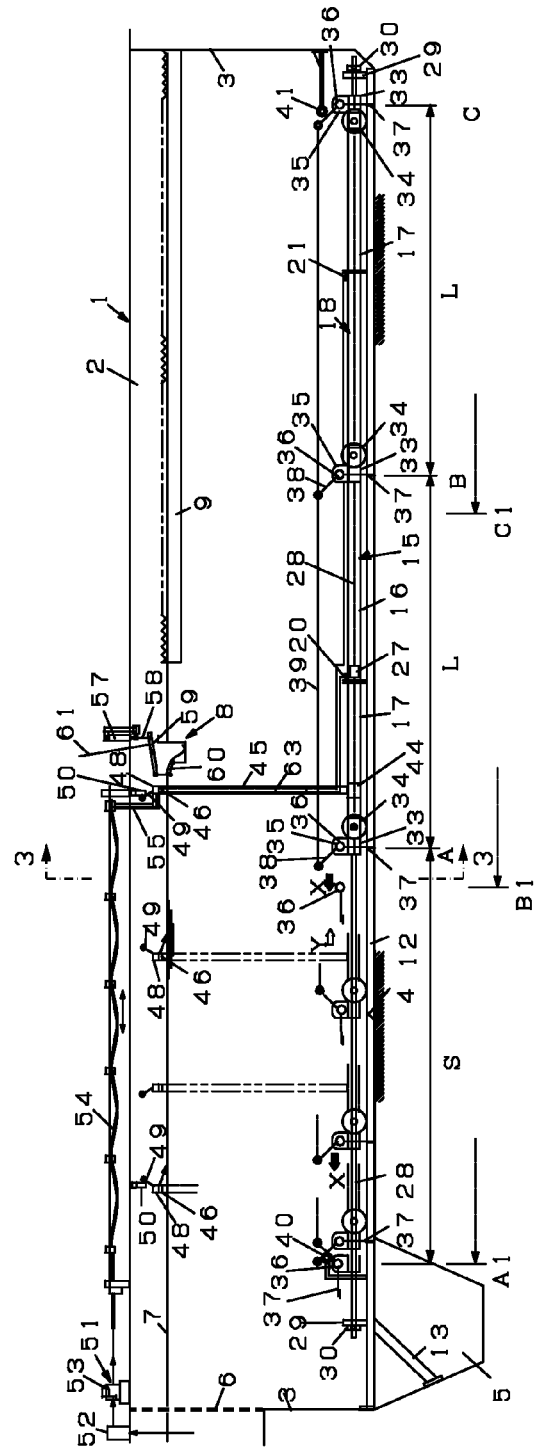
FIG.1
FIG.2

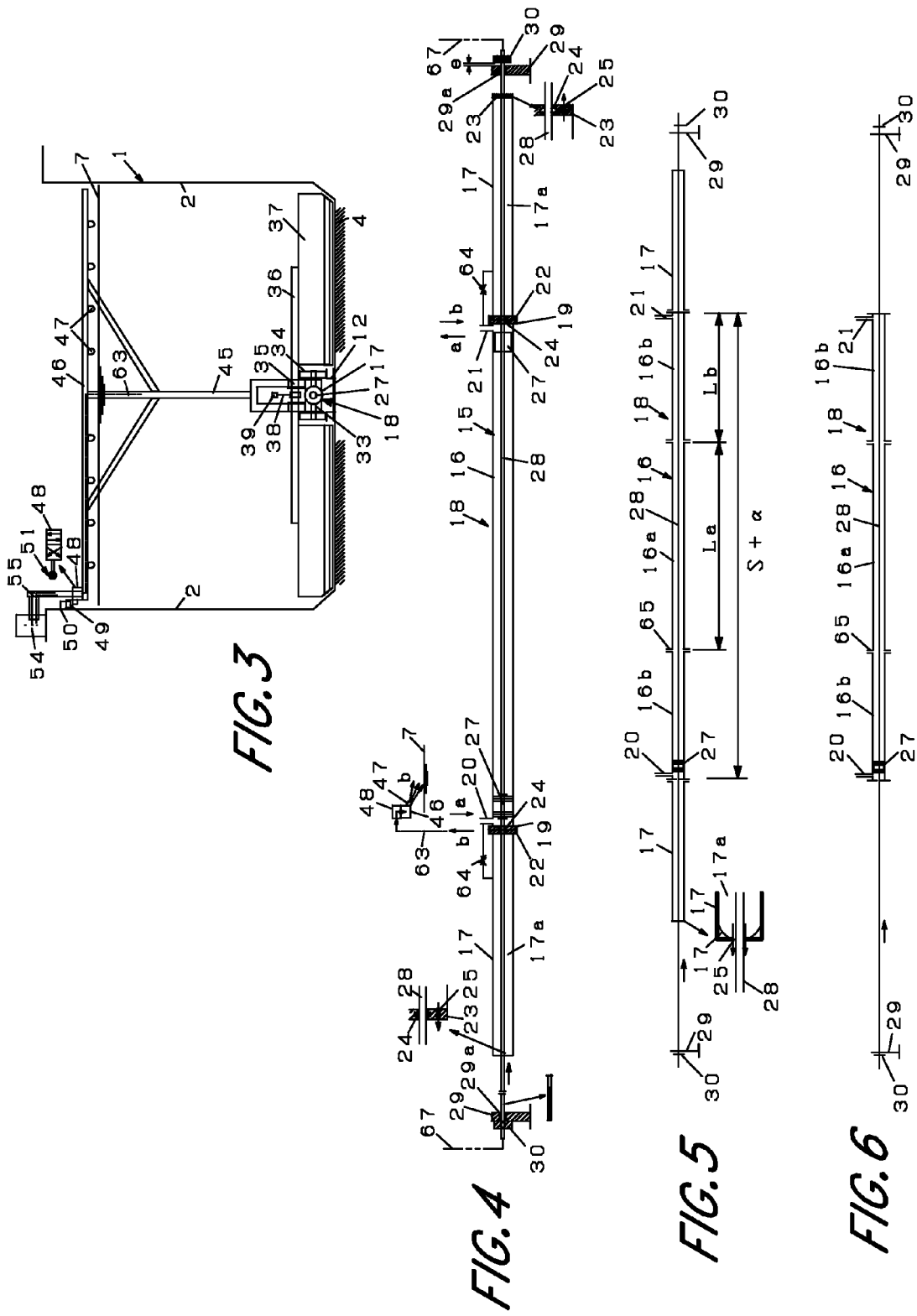

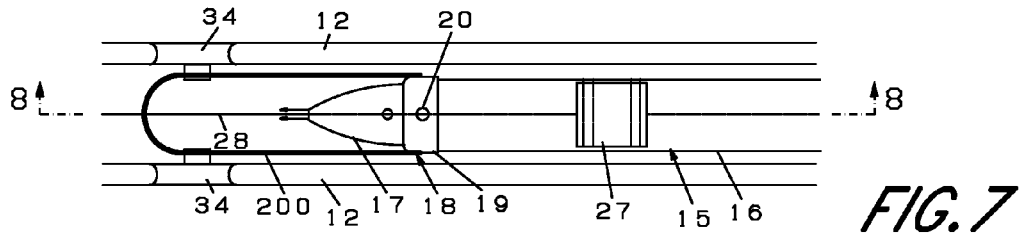
FIG. 7
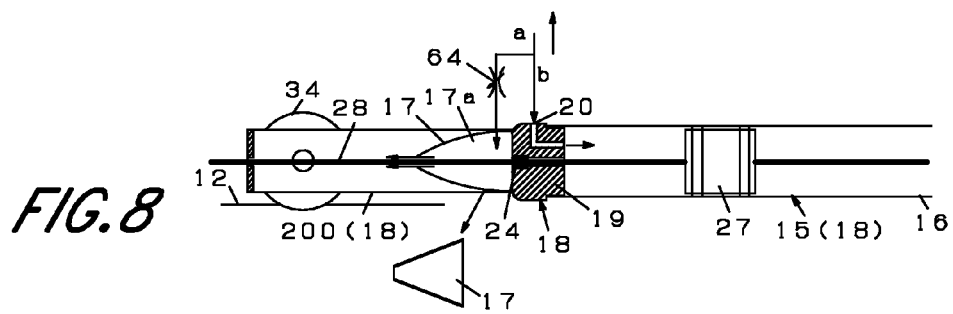
FIG. 8
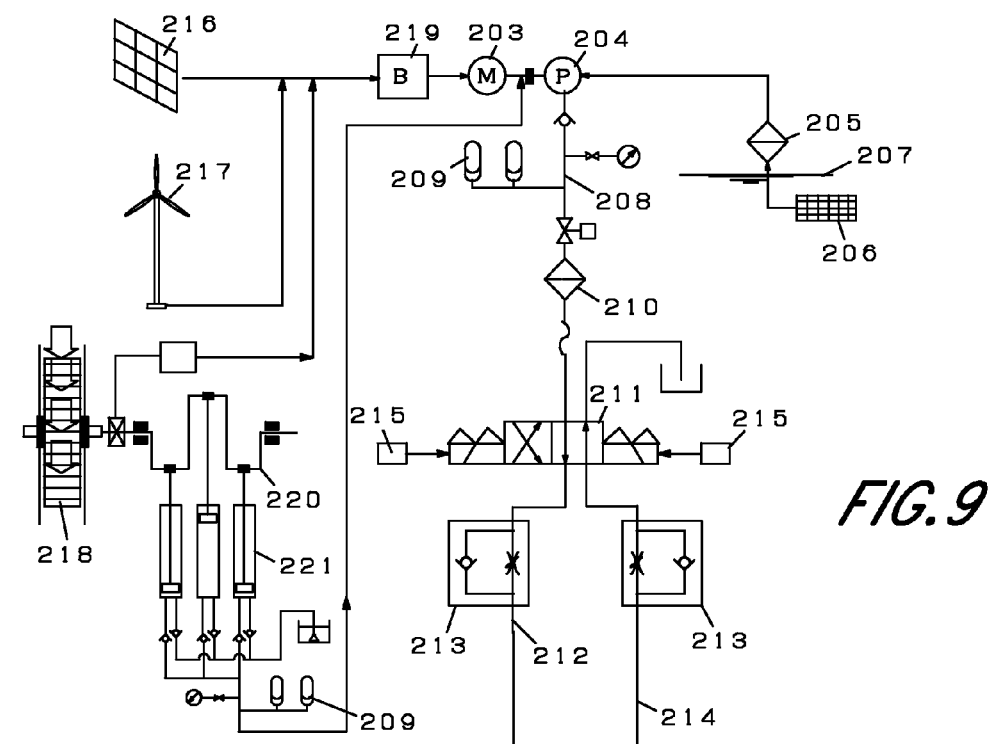
FIG. 9
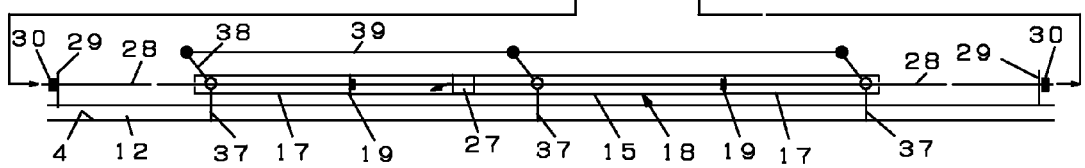

SLUDGE SCRAPING APPARATUS

CROSS REFERENCE TO RELATED APPLICATION

This application claims priority to Japanese Patent Application No. 2011-213396 filed on Sep. 8, 2011 and Japanese Patent Application No. 2012-175102 filed on Aug. 7, 2011 and the disclosure of which including the specification, the drawings, and the claims is hereby incorporated by reference in its entirety.

BACKGROUND OF THE INVENTION

1. Field of the Invention

The present invention relates to a sludge scraping apparatus that is arranged in a rectangular settling reservoir having short sides as front and rear end walls, long sides as right and left side walls, a bottom wall, and a sludge pit on the side of the front end wall in a sludge scraping direction of the bottom wall.

2. Description of the Related Art

For example, sewage flowing into a rectangular settling reservoir settles in the reservoir and accumulates on a bottom wall. The accumulated sediments are scraped up to a pit at one end of the bottom wall and fallen by the sludge scraping apparatus and then, are discharged to the outside.

There are various sludge scraping apparatuses, and one sludge scraping apparatus uses a water cylinder as a driving source.

SUMMARY OF THE INVENTION

Problems to be Solved by the Invention

In a sludge scraping apparatus disclosed in FIG. 39 to FIG. 41 of JP-A-2005-131627, a water cylinder itself is a body, and a rod extends from a front end of the body. Sludge scrapers are provided at a front end and a midpoint of the body, and assumes a vertical scraping position when the body advances by the water cylinder, and assumes a raised non-scraping position when the body retreats.

In the sludge scraping apparatus adopting the water cylinder driving method, since the rod extends long from a hole at a front end of the cylinder forward, for example, when the body advances, the rod is drawn into the cylinder. At this time, sludge as the sediments is drawn together, thereby damaging a gasket or the rod, or introducing the sludge into a water circulation path to cause a trouble. For this reason, a bellows as shown in FIG. 41 is provided at a tip of the cylinder to block the sludge. However, since the bellows repeatedly expands and contracts in an environment where the sludge accumulates and water pressure acts, the bellows may engage with the sludge and thus, cannot expand and contract while remaining straight, and then, may rub against the rod, or cannot withstand the repeated motion, requiring early replacement, which is a serious problem in terms of durability. Moreover, since the bellows does not serve to support force, it allows the road extending long from the cylinder to bend, generating a problem in terms of sealing property.

To solve the above-mentioned problems, an object of the present invention is to provide a sludge scraping apparatus capable of effectively correcting the problem in the sealing property, which tends to occur according to the cylinder driving method used in disadvantageous accumulated sludge.

Means for Solving the Problems

To solve the above-mentioned problems, a sludge scraping apparatus according to the present invention, which is arranged in a rectangular settling reservoir having short sides as front and rear end walls, long sides as right and left side walls, a bottom wall, and a sludge pit on the side of the front end wall in a sludge scraping direction of the bottom wall, and is arranged so as to advance and retreat in a front-back direction along the center of a reservoir width on the bottom wall and between the right and left side walls, the sludge scraping apparatus including:

a guide rail arranged along the center of the reservoir width on the bottom wall;

a traction core member formed of a rod or a rod-like member, the traction core member being arranged on the bottom wall such that the axial center is set along the center of the reservoir width;

a piston attached at a midpoint of the traction core member;

a body shaped like a cylindrical body having sealing connection parts at front and rear ends, the body being formed of a driving cylinder having the piston therein, the traction core member extending through the front and rear sealing connection parts in the front-back direction;

a travelling wheel attached to the outside of the body, the travelling wheel capable of travelling along the guide rail;

a plurality of sludge scrapers attached to the body so as to work together;

position switching means that switches the sludge scrapers to a scraping position at advancement of the body and switches the sludge scrapers to a non-scraping position at retreat of the body; and a treatment part attached at least in front of the driving cylinder in the sludge scraping direction via the sealing connection part, the treatment part having a treatment space therein, the extending part of the traction core member passing through the treatment space, wherein the body can be moved along the traction core member in an advancing and retreating direction by injection/discharge of fluid into/from the driving cylinder by a fluid control means, and at movement of the body, injection/discharge of fluid into/from the treatment space is performed.

Actions and effects of the sludge scraping apparatus with this configuration are as follows. When the body advances along the traction core member, the sludge scraper is in the scraping position, and the sludge is scraped and moved to the sludge pit. When the body retreats along the traction core member, the sludge scraper is in the non-scraping position. The body can be moved in the front-back direction by injection/discharge of fluid into/from the driving cylinder constituting the body. Further, the sealing connection parts are provided in front of and behind the driving cylinder, and treatment parts are provided via the sealing connection part. The driving cylinder and the treatment parts provided in front of and behind the driving cylinder can be integrally moved in the front-back direction. The treatment space is provided in the treatment part, and the traction core member passes through the treatment space and extends in the front-back direction. When the body moves, fluid is also injected/discharged into/from the treatment space by the fluid control means. By providing the treatment parts, sludge can be prevented from entering into the driving cylinder. Further, sludge in the vicinity of the sealing connection parts and in the treatment space can be removed. As a result, the problem related on the sealing property, which tends to occur according to the cylinder driving method used in accumulated sludge as a bad condition, can be effectively improved.

Preferably, a treatment part according to the present invention is an auxiliary cylinder, a sealing part is provided at an end on the opposite side to which the sealing connection part is provided, the traction core member is attached so as to pass through the sealing part, and the sealing part has a through hole that communicates the inside and the outside of the auxiliary cylinder with each other.

The traction core member passes through the sealing connection parts or the sealing parts via, for example, a gasket. Even if sludge enters in the vicinity of the sealing connection parts or the sealing parts, sludge can be removed from the through hole by injection/discharge of fluid into/from the treatment space.

Preferably, the treatment part is tapered toward its front end. Thereby, sludge can be prevented from staying at the front end.

According to the present invention, preferably, a flow path for injection/discharge of fluid into/from the driving cylinder is bifurcated on the way to constitute a bifurcated flow path for injection/discharge of fluid into/from the treatment space. This can simplify a configuration of a flow path.

Preferably, the bifurcated flow path is provided with a flow path throttle. Thereby, the flow into the driving cylinder can be ensured, and the body can be moved in the front-back direction without any problem.

According to the present invention, preferably, receiving members that receive the traction core member at front and rear ends of the traction core member such that the traction core member is axially movable, and stoppers provided in front of the receiving member on the front end side of the traction core member and behind the receiving member on the rear end side of the traction core member are further provided, and the front stopper contacts the front receiving member at scraping and the rear stopper contacts the rear receiving member at non-scraping, thereby restricting a moving range of the traction core member.

When the body moves along the traction core member at scraping and non-scraping, if the traction core member is completely fixed, a compressive force is applied to the traction core member. Such a compressive force causes buckling of the traction core member, disturbing the movement of the body. Thus, by allowing the traction core member to move in the front-back direction by "play", the above-mentioned problem can be solved.

To solve the above-mentioned problems, another sludge scraping apparatus according to the present invention, which is arranged in a rectangular settling reservoir having short sides as front and rear end walls, long sides as right and left side walls, a bottom wall, and a sludge pit on the side of the front end wall in a sludge scraping direction of the bottom wall, and is arranged so as to advance and retreat in a front-back direction along the center of a reservoir width on the bottom wall and between the right and left side walls, the sludge scraping apparatus including:

a guide rail arranged along the center of the reservoir width on the bottom wall;

a traction core member formed of a rod or a rod-like member, the traction core member being arranged on the bottom wall such that the axial center is set along the center of the reservoir width;

a piston attached at a midpoint of the traction core member;

a body shaped like a cylindrical body having sealing connection parts at front and rear ends, the body being formed of a driving cylinder having the piston therein, the traction core member extending through the front and rear sealing connection parts in the front-back direction;

a travelling wheel attached to the outside of the body, the travelling wheel capable of travelling along the guide rail;

a plurality of sludge scrapers attached to the body so as to work together;

position switching means that switches the sludge scrapers to a scraping position at advancement of the body and switches the sludge scrapers to a non-scraping position at retreat of the body;

receiving members that receive the traction core member at front and rear ends of the traction core member such that the traction core member is axially movable;

stoppers provided in front of the receiving member on the front end side of the traction core member and behind the receiving member on the rear end side of the traction core member, wherein the body can be moved along the traction core member in an advancing and retreating direction by injection/discharge of fluid into/from the driving cylinder by a fluid control means, and the front stopper contacts the front receiving member at scraping and the rear stopper contacts the rear receiving member at non-scraping, thereby restricting a moving range of the traction core member.

Actions and effects of the sludge scraping apparatus with this configuration are as follows. When the body advances along the traction core member, the sludge scraper is in the scraping position, and scrapes sludge and moves the sludge to the sludge pit. When the body retreats along the traction core member, the sludge scraper is in the non-scraping position. The body can be moved in the front-back direction by injection/discharge of fluid into/from the driving cylinder constituting the body. The receiving members that receive the traction core member are provided at the front and rear ends of the traction core member, and the stoppers provided in the traction core member restrict the moving range of the traction core member in the front-back direction. When the body moves along the traction core member at scraping and non-scraping, if the traction core member is completely fixed, a compressive force is applied to the traction core member. Such a compressive force causes buckling of the traction core member, disturbing the movement of the body. Thus, by allowing the traction core member to move in the front-back direction by "play", the above-mentioned problem can be solved.

To solve the above-mentioned problems, still another sludge scraping apparatus according to the present invention, which is arranged in a rectangular settling reservoir having short sides as front and rear end walls, long sides as right and left side walls, a bottom wall, and a sludge pit on the side of the front end wall in a sludge scraping direction of the bottom wall, and is arranged so as to advance and retreat in a front-back direction along the center of a reservoir width on the bottom wall and between the right and left side walls, the sludge scraping apparatus including:

a guide rail arranged along the center of the reservoir width on the bottom wall;

a traction core member formed of a rod or a rod-like member, the traction core member being arranged on the bottom wall such that the axial center is set along the center of the reservoir width;

a piston attached at a midpoint of the traction core member;

a body shaped like a cylindrical body having sealing connection parts at front and rear ends, the body being formed of a driving cylinder having the piston therein, the traction core member extending through the front and rear sealing connection parts in the front-back direction;

a travelling wheel attached to the outside of the body, the travelling wheel capable of travelling along the guide rail;

a plurality of sludge scrapers attached to the body so as to work together; and position switching means that switches the sludge scrapers to a scraping position at advancement of the body and switches the sludge scrapers to a non-scraping position at retreat of the body, wherein the body can be moved along the traction core member in an advancing and retreating direction by injection/discharge of fluid into/from the driving cylinder by a fluid control means, and a fluid injection/discharge path is formed in the traction core member and communicates ends of the traction core member with the inside of the driving cylinder.

Actions and effects of the sludge scraping apparatus with this configuration are as follows. When the body advances along the traction core member, the sludge scraper is in the scraping position, and sludge is scraped and moved to the sludge pit. When the body retreats along the traction core member, the sludge scraper is in the non-scraping position. The body can be moved in the front-back direction by injection/discharge of fluid into/from the driving cylinder constituting the body. Fluid is injected/discharged into/from the driving cylinder through the inside of the traction core member. The traction core member can be configured as a part of the flow path, thereby simplifying the configuration of the flow path.

BRIEF DESCRIPTION OF THE DRAWINGS

FIG. 1 is a plan view showing a sludge scraping apparatus in FIG. 2 in accordance with an embodiment of the present invention;

FIG. 2 is a sectional view taken along line II-II in FIG. 1;

FIG. 3 is a sectional view taken along line III-III in FIG. 2;

FIG. 4 is an enlarged sectional view of a water cylinder in FIG. 2;

FIG. 5 is a sectional view showing another embodiment of the water cylinder;

FIG. 6 is a sectional view showing an embodiment of the water cylinder without a treatment part;

FIG. 7 is a plan view showing another embodiment of the treatment part;

FIG. 8 is a sectional view taken along line VIII-VIII in FIG. 7; and

FIG. 9 is an explanatory view showing another embodiment of fluid supply/discharge control means.

DETAILED DESCRIPTION OF THE PREFERRED EMBODIMENTS

Embodiments of the present invention will be described below. A configuration of each embodiment can be applied to configurations of the other embodiments.

In FIGS. 1 to 4, a reference numeral 1 denotes a rectangular settling reservoir. The rectangular settling reservoir 1 includes a right and left side walls 2 as long sides of the rectangle, front and rear end walls 3 as short sides of the rectangle, a bottom wall 4 inclined very gently downward to the left in FIG. 2, and a sludge pit 5 on the left end (front end in the scraping direction) of the bottom wall 4. A reference numeral 6 denotes a flow control plate provided in a sewage inflow part. In FIGS. 1 and 2 showing the settling reservoir 1, the left represents an upstream side and the right represents a downstream side. A scum remover 8 is fixedly installed across the reservoir width on a surface of water 7 midway in the reservoir to periodically take in the scum on the surface of the water 7. A reference numeral 9 denotes an overflow weir arranged on the downstream side. The bottom wall is provided with a base (not shown).

A reference numeral 12 denotes a guide rail. As shown in FIG. 3, the guide rail 12 has a pair of right and left rail bodies as angles (or channel steel) on the base, and is fixedly provided so as to pass the center of the reservoir width as shown in FIG. 1 and extend from the bottom wall 4 to the sludge pit 5 as shown in FIG. 2. The base is not provided on a part corresponding to the sludge pit 5 so as not to cover the sludge pit 5. A reference numeral 13 denotes a supporting member that protrudes from the sludge pit 5 and supports the guide rail 12 from below (see FIG. 2).

A reference numeral 15 denotes a water-pressure driving cylinder. The water-pressure driving cylinder constitutes one cylinder including a cylinder body (cylinder tube) 16 located midway in its front-back direction and cylinder-type treatment parts 17 located in front of and behind the cylinder body 16. The cylinder body 16 and the treatment parts 17 constitute a body 18 of the sludge scraping apparatus. The cylinder body 16 and the treatment parts 17 are cylinder-type and constitute the body 18 having a simple configuration. The treatment parts 17 as a part of the body 18 function to prevent entry of sludge and remove sludge.

Alternatively, the driving cylinder 15 may be an air cylinder or an oil-pressure cylinder. Water, air, oil and the like can be used as fluids for driving the driving cylinder 15.

The cylinder body 16 and the treatment parts 17 located in front of and behind the cylinder body 16 are all formed of a cylindrical body of the same diameter (about 180 mm). The cylinder body 16 has such a length as to ensure a stroke S shown in FIG. 2 (S+α), and first flanges (sealing connection parts) 19 as cylinder heads with a gasket are fixedly attached to respective front and rear ends of the cylinder body 16. The cylinder body 16 may be formed by integrating two or three short cylinders by welding. In this case, a short connecting sleeve can be attached between the cylinders and integrating them by welding. A reference numeral 20 denotes a front water guide port, and a reference numeral 21 denotes a rear water guide port.

The treatment parts 17 each include a second flange 22 and an end flange (sealing part) 23, which correspond to the first flange 19, and these flanges 22 and 23 each are provided with a gasket 24 that prevents reverse entry of external sludge and sewage. An inside of the treatment part 17 constitutes a treatment chamber (treatment space) 17a, and the end flange 23 has an exhaust port (through hole) 25. The first and second flanges 19 and 22 are bonded to each other with a fastener not shown. The treatment part 17 has a length of about 2 m in FIG. 4, but may be shorter, for example, about dozens of centimeters. In this case, a long frame 200 as shown in FIG. 7 may be separately attached to constitute a part of the body 18.

A reference numeral 27 is a piston as a component of the driving cylinder 15, and a state where the piston 27 is positioned at the front end of the cylinder body 16 as shown in FIG. 4 corresponds to a scraping (advancing) position in FIGS. 1 and 2. A state represented by a dashed line in FIG. 4, that is, a state where the piston 27 is positioned at the rear end of the treatment part 17 corresponds to a non-scraping (retreating) position switched from the scraping position. In fact, the piston 27 does not move, and the cylinder body 16 and the treatment parts 17 move.

A reference numeral 28 is a traction core member formed of a metal (SUS) rod as a component of the driving cylinder, and the piston 27 is fixed to some midpoint of the traction core member 28 in its axial direction. The traction core member 28 extends from the inside of the driving cylinder 15 to the treatment chamber 17a in the treatment part 17 via the gasket 24 of the first flange 19 and the second flange 22. The traction core member 28 extends from the treatment chamber 17a in the front-back direction via the gasket 24 of the end flange 23.

A front end and a rear end of the traction core member 28 are inserted into respective through holes 29a of fixing brackets (receiving members) 29 protrudingly arranged on the guide rail 12, and are supported so as to be axially movable. The front and rear ends of traction core member 28 each are provided with a stopper 30, and the stopper 30 contacts the fixing bracket 29, thereby receiving a traction force at advancement and retreat. The front stopper 30 is provided in front of the front fixing bracket 29, and the rear stopper 30 is provided behind the rear fixing bracket 29.

The through hole 29a is formed of a vertically long hole or an unloaded hole such that the traction core member 28 is vertically movable. At scraping shown in FIG. 4, the left side (front side) of traction core member 28 is pulled, thereby causing the front stopper 30 to contact the front fixing bracket 29. Since a compression effect occurs when the stopper 30 contacts the fixing bracket 29, to prevent the compression effect, the right side (rear side) of the traction core member 28 freely moves to the right to prevent the traction core member 28 from buckling. For this reason, as represented by e in the right of FIG. 4, a gap (play) of movement is provided between the fixing bracket 29 and the stopper 30. When the piston 27 starts the state represented by the dashed line in FIG. 4, that is, non-scraping (retreat), the rear stopper 30 contacts the rear fixing brackets 29, and the left side of the traction core member 28 is made free. As a result, the traction core member 28 is subjected to a simple pulling force at all times, and is not subjected to buckling. Although each of the stoppers 30 is fixed to the traction core member 28, by making the stopper 30 movable, the suitable gap e can be obtained. The configuration of the fixing bracket 29 and the stopper 30 can constitute an independent invention. Thus, the configuration of the fixing bracket 29 and the stopper 30 can be applied to the driving cylinder 15 having no treatment part 17 as shown in FIG. 6.

In the ends and the intermediate parts of the body 18 in the front-back direction, as shown in FIGS. 1 and 2, a mount 33 is integrally provided on each side of the body 18. Three pairs of travelling wheels 34 in the front-back direction are attached via the mounts 33 so as to roll on the guide rail 12. The guide rail 12 may be omitted, and the travelling wheels 34 may roll directly on the bottom wall 4. A pair of right and left bearings 35 are attached to other positions of the mount 33, and a sludge scraper 37 is attached to a scraper shaft 36 rotatably inserted via the bearings 35.

Three sludge scrapers 37 are provided in the front-back direction, and a distance between the scrapers 37 is set to L, and can be switched between the vertical scraping (advancing) position represented by a solid line and the forward-rising non-scraping (retreating) position represented by a dashed line. The distance L is set to be shorter than the stroke S of the piston 27 and the cylinder body 16. The three sludge scrapers 37 work together by means of interlocking levers 38 and an interlocking link 39 in FIG. 2. The sludge scraper 37 and the interlocking lever 38 can integrally rotate around the scraper shaft 36.

A reference numeral 40 denotes a front stopper (one of position switching means). When the front sludge scraper 37 advances to the final stage, the front stopper 40 contacts the interlocking lever 38 and rises the sludge scraper 37 to switch the sludge scraper 37 to the horizontal non-scraping position. A reference numeral 41 denotes a rear stopper (one of the position switching means). When the rear sludge scraper 37 retreats to the final stage, the rear stopper 41 contacts the interlocking lever 38 to return the sludge scraper 37 to the vertical scraping position. The interlocking levers 38 or the interlocking link 39 can be combined with a balancer or a spring that stably holds the switching operation between the scraping position and the non-scraping position and each position after switching as one of the position switching means.

In the sludge scraping apparatus, at the scraping position shown in FIGS. 1 to 4, the sludge scrapers 37 are vertical and when water is injected to the front water guide port 20 from this state, and the cylinder body 16 and the treatment parts 17 move forward and come near the stroke S. Then, the sludge scraper 37 is risen by the front stopper 40 and switched to the non-scraping position. Given that positions of the scraper shafts 36 in the scraping position represented by a solid line in FIG. 2 are A, B, C, positions of the scraper shafts 36 in the non-scraping position represented by a dashed line are A1, B1, C1. Accordingly, the first scraper shaft 36 (A1) comes above the sludge pit 5, and the sludge scraper 37 scrapes sludge to the sludge pit 5. The second scraper shaft 36 (B1) and the third scraper shaft 36 (C1) come in front of the first scraper shaft 36 (A) and the second scraper shaft 36 (B), respectively, and scrape sludge up to the positions. That is, in the next stage, the scraped sludge is scraped forward by the sludge scraper 37 returned as shown in FIG. 2. As also disclosed in JP-A-2006-205147 and JP-A-2005-131627, this is an effective method in that rear sludge can be reliably scraped to the sludge pit 5 even with the small stroke S. The length S is set to be slightly longer than the length L.

The state and direction in which the sludge scrapers 37 advance in the scraping position are represented by an arrow X in FIG. 2, and the state and direction in which the sludge scrapers 37 rise and retreat in the non-scraping position are represented by an arrow Y in FIG. 2. After the sludge scrapers 37 are risen, water is injected from the rear water guide port 21, the cylinder body 16 and the treatment parts 17 move to the right, and at the retreat end, the interlocking lever 38 contacts the rear stopper 41 and is rotated forward to switch the sludge scraper 37 to the vertical scraping position.

A support frame 44 is vertically installed on both sides of a front part of the cylinder body 16. A support 45 vertically installed on the support frame 44 protrudes from the surface of the water 7, and a horizontal frame member 46 made of pipe as shown in FIG. 3 is attached to an upper end of the support 45. The horizontal frame member 46 is provided with a nozzle 47 such that water injection for transfer of scum is made at a certain timing (when the horizontal frame members 46 move to the right in FIG. 2). As a matter of course, water injection from the nozzles 47 may be made in all strokes in the reciprocating direction.

A switch valve 48 as shown in FIG. 3 is provided at one end of each horizontal frame member 46, and a switching lever 49 with a roller is attached to the side of the switch valve 48. The switching lever 49 can hold two positions: a first switch position and a second switch position. A contact piece 50 that contacts the switching lever 49 is protrudingly provided on the surface of the side wall 2. As shown in FIGS. 1 and 2, two contact pieces 50 are provided at front and rear positions.

A reference numeral 51 is a fluid supply/discharge control means. In the control means 51, a reference numeral 52 denotes a filter, and a reference numeral 53 denotes a water pump with a controller that pumps up sewage or clean water, which flows through or is accumulated in a water treatment facility, feeds it to a next flexible water feed tube 54 and supplies water to a port of the switch valve 48 through a piping stay 55. The scum remover 8 is configured such that a driving arm 59 driven by driving means 57 such as a unique electric or water cylinder presses a weir 60 via a chain 58 to take in scum flowing on the surface of the water 7. Thus, although a manual arm 61 can be operated independently from the driving means 57, the weir 60 may be lowered with approaching of the support 45 and may be returned by a buoyant force of the weir 60.

The state in FIGS. 1 to 4 shows timing at which the non-scraping (retreat) state is switched to the scraping (advancing) state. The switching lever 49 contacts the rear contact piece 50 as shown in FIG. 2, thereby switching the switch valve 48 to a straight circuit in FIG. 3. Accordingly, water is injected to the front water guide port 20 via a in-support (or out-of-support) pipe 63 through the support 45 as represented by an arrow a, and is discharged from the rear water guide port 21 and returned to a source as represented by an arrow a. By this water injection, the body 18 advances in the direction of the arrow X in FIG. 2. When the preceding interlocking lever 38 contacts the front stopper 40, the sludge scraper 37 is switched to the horizontal non-scraping position. At the same time, the switching lever 49 contacts the front contact piece 50 on the surface of water, and is switched. Thereby, the switch valve 48 is switched to a cross circuit in FIG. 3. Accordingly, water is injected to the rear water guide port 21 in FIG. 4 as represented by an arrow b, and is discharged from the front water guide port 20 as represented by an arrow b and returned. The returned water is used to transfer scum as represented by b in FIG. 4. The cylinder body 16 and the treatment parts 17 retreat with the sludge scraper 37 being risen, and the last interlocking lever 38 contacts the rear stopper 41, resulting in that the sludge scraper 37 is forwardly switched to the scraping position. Although the returned water in FIG. 4 is injected from the nozzle 47, water may be directly injected from the water pump 53 through the switch valve 48.

The front and rear treatment parts 17 function to prevent warp of the traction core member 28, but sliding at the gasket 24 may cause wear, which is undesirable. A cause for wear is flow-in of external sludge and sewage. To prevent the flow-in, water may be injected to the treatment parts 17 through another pipe to wash the inside. Alternatively, as shown in FIG. 4, water may be injected through a bypass tube 65 with a throttle 64, which leads to the front water guide port 20 and the rear water guide port 21, and be discharged from the exhaust port 25 to wash the inside at all times. By providing the throttle 64, a flow into the treatment parts 17 can be suppressed, thereby ensuring a flow into the driving cylinder 15.

Since water discharged from the exhaust port 25 is pressurized water, when the water is injected to a place in front of the gasket 24 around the traction core member 28, accumulated sludge can be prevented from entering into the treatment chamber 17a. For this reason, as shown in a lower left column in FIG. 5, the exhaust port 25 may be made near the center of the end flange 23. By making the shape of the tip of the treatment part 17 to be semicircle as represented by a dashed line in the lower left column in FIG. 5 rather than a flat surface vertical to the traction core member 28, sludge coming from the front can be removed along the surface of the circle, thereby preventing entry of sludge into the treatment chamber 17a.

The guide rail 12 can take measures against earthquake with use of a buffer such as a vibration-proofing rubber placed between the guide rail 12 and the bottom wall 4. Although the sludge scraper 37 can be switched between the vertical position and the horizontal position, when the apparatus was placed in the reservoir to make a travelling test, the switched state could not be conventionally confirmed from above the reservoir. Therefore, for the confirmation, to inform that the sludge scraper 37 is switched to the person above the reservoir, for example, air may be jetted into the water or sound may be generated on the water.

Generally, an inner circumference of the cylinder body 16 is honed. At present, the honing length is limited to about 4 m. The cylinder body 16 is generally long, for example, 9 to 10 m as shown in FIG. 4, which is much longer than 4 m. In this case, short honed cylinders can be welded to each other to make the long cylinder 16 as described above. Alternatively, as shown in FIG. 5, a plurality of short cylinder bodies 16a, 16b having a length La, Lb of about 4 m may be bonded to each other with a flange 65 to make one honed cylinder body 16. Although the three cylinder bodies 16a, 16b, 16b are bonded to one another in this case, the number is not limited to three, and may be two or four or more.

Further, in another embodiment of the traction core member 28, all or a part of the traction core member 28 is formed of a rod-like member shaped by using a carbon fiber (including a carbon fiber-reinforced carbon composite) or nylon fiber as a base material, which is commercialized as a carbon shaft. In this case, by coating the surface, sliding performance can be improved.

Although the traction core member 28 is solid, it may be configured as a pipe-like water or air pipe having a fluid passage as a part of fluid control means. When the traction core member 28 is formed of a pipe, pipes (or tube) 67 from the switch valve 48 are connected to front and rear end in FIG. 4 such that water or air can be introduced into a left injection area of the piston 27 through a left end of the traction core member 28. Further, water or air can be introduced into a right injection area of the piston 27 through a right end of the traction core member 28, simplifying structure. In this case, the switch valve 48 is installed at a fixed position above the reservoir, and the switching mechanism is easily configured of detection switches opposed to advancing and retreating end of the support 45 and valve switching means (solenoid or the like) working together with the detection switches. As compared to the case where the movable means such as the water feed tube 54 and the movable support 45 constitute the fluid control means, by making the pipe-like traction core member 28 in this manner, fluid injection and discharge can be performed with use of the stationary devices and pipes without using the support 45 as shown in FIG. 3. In this case, by arranging the detection switches opposed to advancing and retreating end of the body 18 and operating the switch valve 48 together with the detection switches, fluid injection and discharge can be controlled.

<Another Embodiment of Treatment Part>

FIGS. 7 and 8 show another embodiment of the treatment parts 17. In this embodiment, the treatment part 17 provided in front of a sealing connection part 19 provided at the front end of the driving cylinder 15 is shaped like a cannonball that is tapered toward its front. This can remove sludge so as not to stay at the front end of the treatment part 17. A front end port of the treatment part 17 functions as an injecting port and can inject water around the traction core member 28, thereby preventing entry of sludge and discharging sludge even if it enters. This treatment part 17 may be shaped like a cone as shown in a lower column in FIG. 8. In either case, the treatment part 17 is tapered toward its front end.

Considering its shape and length, this treatment part 17 does not constitute the body 18. In this case, a frame 200 protruding forward from the driving cylinder 15 is attached to form a part of the body 18, and the travelling wheel 34 and the sludge scraper 37 not shown are attached via the frame 200. By making a front end of the frame 200 to be semicircular or mountain-like, sludge coming from the front can be divided so as not to enter the treatment part 17. The frame 200 is formed of a plate-like member and covers the traction core member 28 in a side view of FIG. 8, but exposes the traction core member 28 in a plan view in FIG. 7.

<Another Embodiment of Flow Path>

FIG. 9 shows another embodiment. Water flowing in a water treatment facility such as a settling reservoir 202 or water from a retained water source as it is short of pressure as a driving source for the driving cylinder 15. For this reason, the water in the water source needs to be pressurized water. FIG. 9 shows a method thereof. A reference numeral 203 denotes a driving motor, a reference numeral 204 denotes a water pump, a reference numeral 205 denotes a second filter, and a reference numeral 206 denotes a first filter in a water source 207. When the water pump 204 is driven, retained water in the water source 207 is sent to a water feed pipe 208. A reference numeral 209 denotes an accumulator and a reference numeral 210 denotes a third filter 210. The third filter 210 leads to a pipe 212 through a switch valve 211. The switch valve 211 is a 2-position valve type, and is in a straight switching position for scraping in the figure. A reference numeral 213 denotes a throttle valve with check valve that is also provided on the side of a pipe 214. A reference numeral 215 denotes limit switches. The limit switches 215 are opposed to each other so as to operate when the body 18 reaches the left end and the right end, respectively, and the position of the switch valve 211 is switched by the switch 215. The switch valve 211 may be a 3-position valve type including a stop position.

Methods for driving the water pump 204 are a method using a solar electric generator 216, a method using a wind electric generator 217, and a method of generating electricity with use of a water wheel 218 using a water source. These methods may be used alone or may be combined with each other. A reference numeral 219 denotes a battery. The method using the water wheel 218 may be a method of driving a cylinder 221 via a crank 220 and converting water from a water source into pressurized water to supply the pressurized water to the water pump 204. Any of these methods is used or the methods are combined to each other to drive the water pump 204.

In FIG. 9, at scraping, water sent from the pipe 212 passes through the inner flow path of the traction core member 28 via the front end of the traction core member 28, and is injected into a space between the piston 27 and the sealing connection part 19. To inject water into the space, a hole not shown is formed in the surface of the traction core member 28. At non-scraping, water is discharged from the pipe 212 through a reverse route. The same applies to the pipe 214 connected to the rear end of the traction core member 28.

A sludge scraping apparatus at the end of the scraping position, which is shown in a lower part in FIG. 9, has a configuration that is partially different from that of the embodiment. In the apparatus, a pair of right and left round rod-like or a round pipe-like guide rails 12 are fixedly arranged at the center of the reservoir width of the bottom wall 4 in parallel to each other, and travelling wheels on the side of a body are rolled on the guide rails 12, thereby enabling advancement and retreat. The travelling wheels each have an outer groove having a semicircular cross section substantially conforming to the guide rail 12. Plural pairs of (four in the figure) right and left travelling wheels corresponding to the guide rails 12 may be arranged in the front-back direction on both sides of the body. Since the guide rails 12 each have a round outer circumference, sludge does not accumulate on upper surfaces of the rails and falls. As a result, since the travelling wheels rolling on the rails can also travel in the no-sludge state at all times, the body including a below-mentioned driving cylinder stably travels, and sludge scrapers also keep their stable position having less movement side to side, resulting in that sludge can be hardly left and be scraped stably and reliably.

This can be also applied to an embodiment shown in FIGS. 7 and 8. The body includes the driving cylinder that has sealing connection parts in front of and behind the driving cylinder and passes slightly above the bottom wall 4 at the center of the reservoir width. In this example, the driving cylinder constitutes a front body part. In the case where the driving cylinder is configured as the front part of the body as described above, since the front part of the body becomes heavy, the body stably travels, resulting in that sludge scrapers hardly leaves sludge and the reliable scraping can be performed.

However, the driving cylinder may be arranged on a rear side of the body to constitute a rear part of the body. When the driving cylinder is configured as the rear part of the body, since the front sealing connection parts of the driving cylinder advances and retreats in a place with a small amount of accumulated sludge, the possibility of entry of sludge from the sealing connection part can be decreased. A front end bracket is formed of a pair of right and left members extending forward when viewed from above. The first travelling wheel is attached via the front end bracket, and a scraper shaft and the sludge scraper are attached via a bearing. A reference numeral 38 denotes interlocking levers, and a reference numeral 39 denotes an interlocking link. The second travelling wheel and the sludge scrapers are attached via the rear outer circumference of the driving cylinder.

A connecting body is a long pipe having a smaller diameter than the driving cylinder and constitutes a rear part of the body. A front end of the connecting body is connected via the flange to an upper position of the sealing connection part as the rear part of the driving cylinder in a sealed and detachable manner. A rear end of the connecting body is sealed. The third and fourth travelling wheels, the scraper shafts, the sludge scrapers and the interlocking levers are attached via the outer circumference of the connecting body. The front and rear interlocking levers are interlokingly coupled to each other by the interlocking link. A coupling part between the interlocking lever and the interlocking link contacts a front stopper arranged forward, thereby switching the illustrated scraping position to the forward-rising non-scraping position. When returning to the rearward, a rear coupling part contacts a rear stopper not shown, thereby returning the non-scraping position to the scraping position.

The interlocking levers can be operated at the same time by a water-pressure cylinder not shown to enable the sludge scrapers to switch between the scraping position and the non-scraping position. However, according to a method of adding a balancer to the interlocking lever to switch back and forth, the configuration can be simplified and further, troubles can be reduced. A reference numeral denotes a rod-like traction core member. The rod-like traction core member is received by front and rear fixed receiving members to be axially movable, and as described above, is configured so as not to occur buckling with use of a stopper such as a nut. A piston is provided in the driving cylinder of the traction core member. This traction core member has a fluid path opened from its front end to the front of the piston and communicates with the pipe 212, and has a fluid path opened from its rear end to the rear of the piston and communicates with the other pipe. In place of this communicating method through the traction core member, a method of communicating a front water guide port and a rear water guide port with the pipe 212 and 214, respectively, as represented by a dashed line in FIG. 9, may be adopted.

Although water in the cylinder is discharged or retained from a return port of the switch valve 211 into a container such as a tank, the water in the cylinder may be returned to the water pump 204 and recirculated. This can be applied to other embodiment.

The fluid supply/discharge control means in FIG. 9 can be combined with the sludge scraping apparatus in FIG. 2.

What is claimed is:

1. A sludge scraping apparatus that is arranged in a rectangular settling reservoir having short sides as front and rear end walls, long sides as right and left side walls, a bottom wall, and a sludge pit on a side of a front end wall in a sludge scraping direction of the bottom wall, and is arranged so as to advance and retreat in a front-back direction along the center of a reservoir width on the bottom wall and between the right and left side walls, the sludge scraping apparatus comprising:
   a guide rail arranged along the center of the reservoir width on the bottom wall;
   a traction core member formed of a rod or a rod-like member, the traction core member being arranged on the bottom wall such that the axial center is set along the center of the reservoir width;
   a piston attached at a midpoint of the traction core member;
   a body shaped like a cylindrical body having sealing connection parts at front and rear ends, the body being formed of a driving cylinder having the piston therein, the traction core member extending through the front and rear sealing connection parts in the front-back direction;
   a travelling wheel attached to the outside of the body, the travelling wheel capable of travelling along the guide rail;
   a plurality of sludge scrapers attached to the body so as to work together;
   a switch configured to switch the sludge scrapers to a scraping position at advancement of the body and switches the sludge scrapers to a non-scraping position at retreat of the body;
   a treatment part attached at least in front of the driving cylinder in the sludge scraping direction via the sealing connection part, the treatment part having a treatment space therein, the extending part of the traction core member passing through the treatment space, wherein
   the body can be moved along the traction core member in an advancing and retreating direction by injection/discharge of fluid into/from the driving cylinder,
   at movement of the body, injection/discharge of fluid into/from the treatment space is performed, and
   a flow path for injection/discharge of the fluid into/from the driving cylinder is bifurcated on the way to constitute a bifurcated flow path for injection/discharge of fluid into/from the treatment space, so as to divide the fluid, respectively.

2. The sludge scraping apparatus according to claim 1, further comprising
   an auxiliary cylinder, and
   a sealing part provided at an end on the opposite side to which the sealing connection part is provided,
   wherein the traction core member is attached so as to pass through the sealing part, and the sealing part has a through hole through which communicates the inside and the outside of the auxiliary cylinder communicate with each other.

3. The sludge scraping apparatus according to claim 2, wherein
   the auxiliary cylinder is tapered toward a front end thereof.

4. The sludge scraping apparatus according to claim 1, wherein
   the traction core member passes through the sealing connection parts or a sealing part via a gasket.

5. The sludge scraping apparatus according to claim 1, wherein the bifurcated flow path is provided with a flow path throttle.

6. The sludge scraping apparatus according to claim 1, further comprising:
   receiving members that receive the traction core member at front and rear ends of the traction core member such that the traction core member is axially movable; and
   stoppers provided in front of the receiving member on the front end side of the traction core member and behind the receiving member on the rear end side of the traction core member, wherein
   the front stopper contacts the front receiving member at scraping and the rear stopper contacts the rear receiving member at non-scraping, thereby restricting a moving range of the traction core member.

7. A sludge scraping apparatus that is arranged in a rectangular settling reservoir having short sides as front and rear end walls, long sides as right and left side walls, a bottom wall, and a sludge pit on the side of the front end wall in a sludge scraping direction of the bottom wall, and is arranged so as to advance and retreat in a front-back direction along the center of a reservoir width on the bottom wall and between the right and left side walls, the sludge scraping apparatus comprising:
   a guide rail arranged along the center of the reservoir width on the bottom wall;
   a traction core member formed of a rod or a rod-like member, the traction core member being arranged on the bottom wall such that the axial center is set along the center of the reservoir width;
   a piston attached at a midpoint of the traction core member;
   a body shaped like a cylindrical body having sealing connection parts at front and rear ends, the body being formed of a driving cylinder having the piston therein, the traction core member extending through the front and rear sealing connection parts in the front-back direction;
   a travelling wheel attached to the outside of the body, the travelling wheel capable of travelling along the guide rail;
   a plurality of sludge scrapers attached to the body so as to work together;
   a switch configured to switch the sludge scrapers to a scraping position at advancement of the body and switches the sludge scrapers to a non-scraping position at retreat of the body;
   a treatment part attached at least in front of the driving cylinder in the sludge scraping direction via the sealing connection part, the treatment part having a treatment space therein;
   receiving members that receive the traction core member at front and rear ends of the traction core member such that the traction core member is axially movable; and
   stoppers provided in front of the receiving member on the front end side of the traction core member and behind the receiving member on the rear end side of the traction core member, wherein
   the body can be moved along the traction core member in an advancing and retreating direction by injection/discharge of fluid into/from the driving cylinder, and the front stopper contacts the front receiving member at scraping and the rear stopper contacts the rear receiving member at non-scraping, thereby restricting a moving range of the traction core member, wherein a flow path for injection/discharge of fluid into/from the driving cylinder is bifurcated on the way to constitute a bifurcated flow path for injection/discharge of fluid into/from the treatment space, so as to divide the fluid, respectively.

8. A sludge scraping apparatus that is arranged in a rectangular settling reservoir having short sides as front and rear end walls, long sides as right and left side walls, a bottom wall, and a sludge pit on the side of the front end wall in a sludge scraping direction of the bottom wall, and is arranged so as to advance and retreat in a front-back direction along the center of a reservoir width on the bottom wall and between the right and left side walls, the sludge scraping apparatus comprising:

a guide rail arranged along the center of the reservoir width on the bottom wall;

a traction core member formed of a rod or a rod-like member, the traction core member being arranged on the bottom wall such that the axial center is set along the center of the reservoir width;

a piston attached at a midpoint of the traction core member;

a body shaped like a cylindrical body having sealing connection parts at front and rear ends, the body being formed of a driving cylinder having the piston therein, the traction core member extending through the front and rear sealing connection parts in the front-back direction;

a travelling wheel attached to the outside of the body, the travelling wheel capable of travelling along the guide rail;

a plurality of sludge scrapers attached to the body so as to work together;

a switch configured to switch the sludge scrapers to a scraping position at advancement of the body and switches the sludge scrapers to a non-scraping position at retreat of the body, and a treatment part attached at least in front of the driving cylinder in the sludge scraping direction via the sealing connection part, the treatment part having a treatment space therein, wherein the body can be moved along the traction core member in an advancing and retreating direction by injection/discharge of fluid into/from the driving cylinder, a fluid injection/discharge path is formed in the traction core member and communicates ends of the traction core member with the inside of the driving cylinder, and a flow path for injection/discharge of fluid into/from the driving cylinder is bifurcated on the way to constitute a bifurcated flow path for injection/discharge of fluid into/from the treatment space, so as to divide the fluid, respectively.

* * * * *